(12) United States Patent
Muller et al.

(10) Patent No.: US 8,020,654 B2
(45) Date of Patent: Sep. 20, 2011

(54) DRIVETRAIN OF A HYBRID MOTOR VEHICLE

(75) Inventors: Thorsten Muller, Friedrichshafen (DE); Markus Hoher, Tettnang (DE); Linus Eschenbeck, Wangen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 487 days.

(21) Appl. No.: 12/165,746

(22) Filed: Jul. 1, 2008

(65) Prior Publication Data
US 2009/0050384 A1   Feb. 26, 2009

(30) Foreign Application Priority Data

Aug. 1, 2007   (DE) .......................... 10 2007 036 098

(51) Int. Cl.
*B60K 6/36* (2007.10)
(52) U.S. Cl. .................... 180/65.6; 180/65.21; 903/910; 903/912
(58) Field of Classification Search ............... 180/65.21, 180/65.6, 65.7; 903/909, 910, 912, 914, 903/916
See application file for complete search history.

(56) References Cited

U.S. PATENT DOCUMENTS

| | | | | |
|---|---|---|---|---|
| 6,116,398 | A * | 9/2000 | Kosumi et al. | 192/70.27 |
| 6,880,664 | B2 * | 4/2005 | Pecnik et al. | 180/243 |
| 7,081,725 | B2 * | 7/2006 | Seely et al. | 318/139 |
| 7,160,223 | B2 * | 1/2007 | Colvin | 477/3 |
| 7,261,660 | B2 * | 8/2007 | Sowul et al. | 475/5 |
| 2005/0173167 | A1 | 8/2005 | Seely et al. | |
| 2006/0025265 | A1 | 2/2006 | Sowul et al. | |

FOREIGN PATENT DOCUMENTS
DE   10319108 A1   12/2003

* cited by examiner

*Primary Examiner* — John Walters
(74) *Attorney, Agent, or Firm* — David & Bujold, P.L.L.C.

(57) ABSTRACT

A drivetrain is proposed for a hybrid motor vehicle, which comprises an electric machine arranged between the vehicle's transmission (2) and a differential (8) of a driven axle in order to drive the axle via a Cardan shaft (7) or another shaft capable of torque transfer in which a transmission (10) made as a reducing gear system is arranged in the force flow direction behind the electric machine in order to produce the necessary speeds and torques and transfer them to the Cardan shaft or to the other shaft.

17 Claims, 3 Drawing Sheets

DRIVETRAIN OF A HYBRID MOTOR VEHICLE

This application claims priority from German Application Serial No. 10 2007 036 098.5 filed Aug. 1, 2007.

FIELD OF THE INVENTION

The present invention relates to the drivetrain of a hybrid motor vehicle.

BACKGROUND OF THE INVENTION

In the hybridization of motor vehicles, according to the prior art, the system consisting of a combustion engine and the transmission can be equipped with a crankshaft starter generator, with an electric machine arranged co-axially in the area of the Cardan shaft for driving under electric power or for recuperation. With such an arrangement, the rear axle differential of the vehicle is driven by the transmission via one or more Cardan shafts. The rotor of the electric machine is usually connected to the Cardan shaft or to another shaft in a rotationally fixed manner with the Cardan shaft, whereby the electric machine can be used for boosting or recuperation or for driving purely under electric power when certain clutches are disengaged in the transmission so that the transmission is idling.

The speed of the Cardan shaft is determined by the transmission ratios and the driving speed desired. As a rule the structure of the electric machine is designed so that with the smallest sized electric machine, the highest possible torque can be transmitted to the Cardan shaft. For that purpose, it may be necessary to construct the electric machine so that it runs at a substantially higher speed than the Cardan shaft.

The purpose of the present invention is to indicate a design for the drivetrain of a hybrid motor vehicle, whereby the force flow is optimized.

SUMMARY OF THE INVENTION

Accordingly, in a drivetrain of a hybrid motor vehicle comprising, between the vehicle's transmission and the differential of a driven axle, an electric machine arranged for driving the axle via a Cardan shaft or some other shaft capable of torque transfer. It is proposed to arrange a gearbox, designed as a reducing gear system, in the force flow direction behind the electric machine in order to produce the required speeds and torques and transfer them to the Cardan shaft or the other shaft. The reducing gear system and the electric machine itself are preferably arranged as a unit in a housing.

Thanks to the concept according to the invention, the electric machine can run at speeds substantially higher than the Cardan shaft so as to have the ability to transfer the highest possible torque to the Cardan shaft.

According to the invention, a planetary transmission is provided and preferably arranged downstream from the electric machine and co-axially with respect to the Cardan shaft or to another shaft capable of torque transfer.

According to the invention, in a first embodiment it is proposed that the sun gear of the planetary transmission is connected in a rotationally fixed manner to the motor of the electric machine, the ring gear is coupled to a housing and the drive output takes place via the carrier, which is connected in a rotationally fixed manner to a Cardan shaft or other torque-transferring shaft.

In this case, the electric machine and the planetary transmission are arranged as a unit in a housing. According to the invention, the drive input from the vehicle's transmission and the drive output to the Cardan shaft are each realized by way of a flange, and the vehicle's transmission is fixed on the chassis of the vehicle.

According to a further embodiment of the invention, the ring gear of the planetary transmission is connected in a rotationally fixed manner to the rotor of the electric machine, the sun gear is coupled to a housing and the carrier of the planetary transmission forms the drive output to the Cardan shaft or to another shaft capable of transferring the torque.

Alternatively, it can be provided that the planetary transmission is arranged as a static transmission, such that the sun gear of the planetary transmission is connected in a rotationally fixed manner to the rotor of the electric machine, the carrier is coupled to a housing and the drive output to the Cardan shaft or to another torque-transferring shaft takes place via the ring gear.

According to the invention, in an advantageous further development, a separating clutch can be provided, which can interrupt the flow of force between the rotor of the electric machine and the Cardan shaft or other torque-transferring shaft. This is particularly advantageous when, in certain speed ranges, the electric machine should be uncoupled from the drivetrain. The clutch can be actuated hydraulically, mechanically or electrically.

Furthermore, it can be provided that when driving under electric power alone, the connection of the electric machine and the transmission is interrupted by a clutch to avoid transmission losses.

In cases when a planetary transmission cannot be co-axially arranged, for example for lack of space in the vehicle, the reducing gearbox and the electric machine can advantageously be arranged axially offset relative to the Cardan shaft or other torque-transferring shaft, the reducing gearbox and the electric machine then being driven by means for axially offset torque transfer.

In such a case, it is appropriate for a spur drive, a chain drive and/or a belt to be provided as the way for axially offset torque transfer.

Furthermore, according to the invention, it is proposed to form the connection between the electric machine and the Cardan shaft or other torque-transferring shaft by way of a spur drive with a suitable ratio.

BRIEF DESCRIPTION OF THE DRAWINGS

The invention will now be described, by way of example, with reference to the accompanying drawings in which.

DETAILED DESCRIPTION OF THE INVENTION

Figure 1:
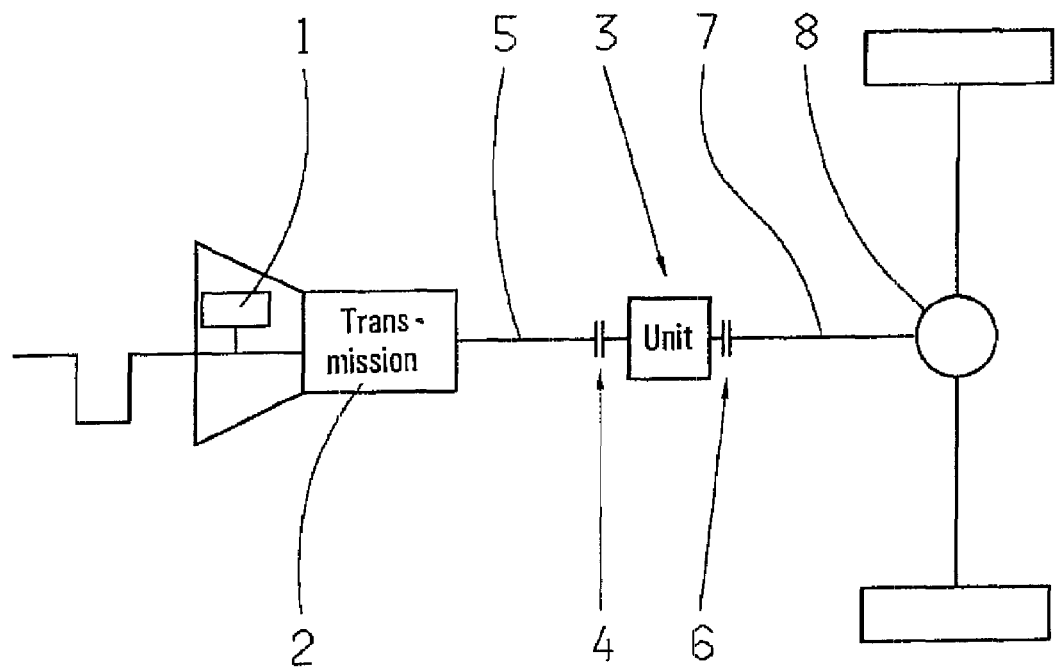
FIG. 1 is a schematic representation of the arrangement of the unit comprising an electric machine and a planetary transmission designed as a planetary reducing gear system in the drivetrain of a motor vehicle.

FIG. 1 shows a drivetrain of a motor vehicle which comprises a crankshaft starter generator 1, a transmission 2 and a unit 3 consisting of an electric machine and a planetary transmission that forms a reducing gear system and is arranged co-axially with respect to the Cardan shaft 7, which is connected by a first flange 4 to the transmission output shaft 5 and by a second flange 6 to the Cardan shaft 7 or to a shaft in a rotationally fixed manner with the Cardan shaft 7.

In this case, the rear axle differential 8 of the vehicle is driven by the Cardan shaft 7. The electric machine and the planetary transmission are arranged in a housing. Instead of the Cardan shaft 7, another shaft capable of torque transfer can be provided.

Figure 2:
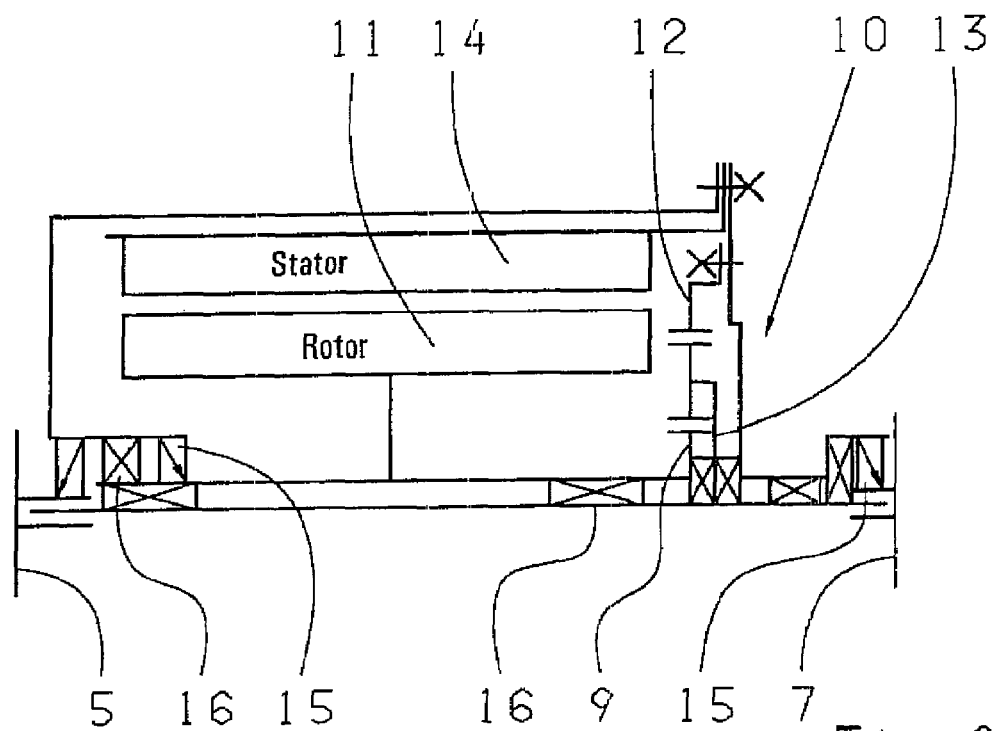
FIG. 2 is a schematic representation of the connection of the electric machine to the planetary transmission according to a first embodiment of the invention.

According to the invention, for certain ratio ranges, the arrangement of the planetary transmission, shown in FIG. 2, can be advantageous. Here, a sun gear 9 of a planetary transmission 10 is connected in a rotationally fixed manner to a rotor 11 of the electric machine, a ring gear 12 is coupled to a housing, and the drive output takes place via a carrier 13, which is connected in a rotationally fixed manner to the drive output to the Cardan shaft 7 or to another torque-transferring shaft. In FIG. 2, a stator of the electric machine is indexed 14. Furthermore, shaft seal rings are indexed 15 and bearings are indexed 16.

As an alternative to the arrangement shown in FIG. 2, the unit 3 can be attached directly on the differential 8 so that the drive-output connection to the Cardan shaft 7 is not needed.

Figure 3:
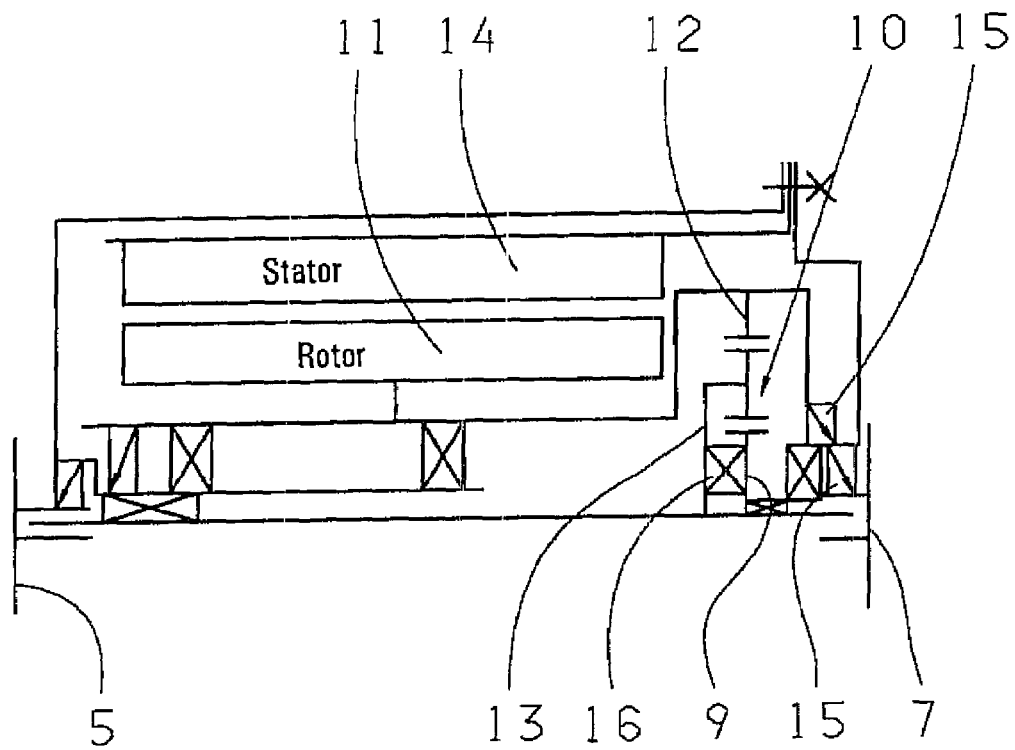
FIG. 3 is a schematic representation of the connection of the electric machine to the planetary transmission according to a second embodiment of the invention.

In the example embodiment shown in FIG. 3 the ring gear 12 of the planetary transmission 10 is connected in a rotationally fixed manner to the rotor 11 of the electric machine, the sun gear 9 is coupled to a housing and the carrier 13 of the planetary transmission 10 forms the drive output to the Cardan shaft 7 or another torque-transferring shaft. In this case too, the unit 3 could be attached directly on the differential 8.

Figure 4:
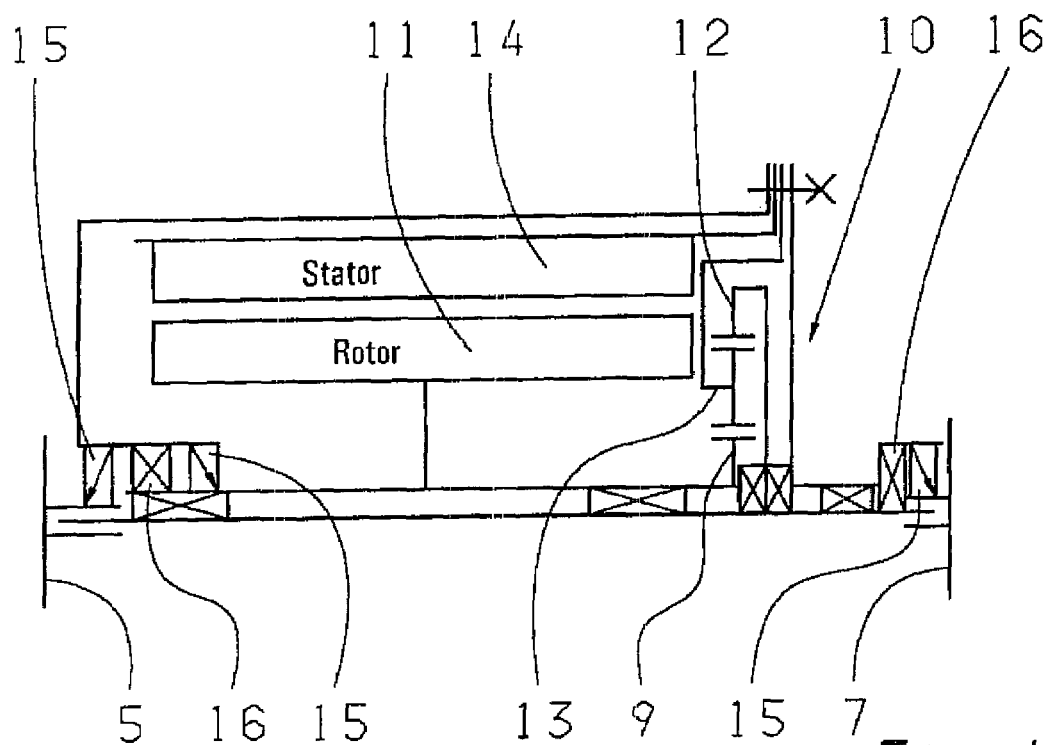
FIG. 4 is a schematic representation of the connection of the electric machine to the planetary transmission according to another embodiment of the invention.
Figure 5:
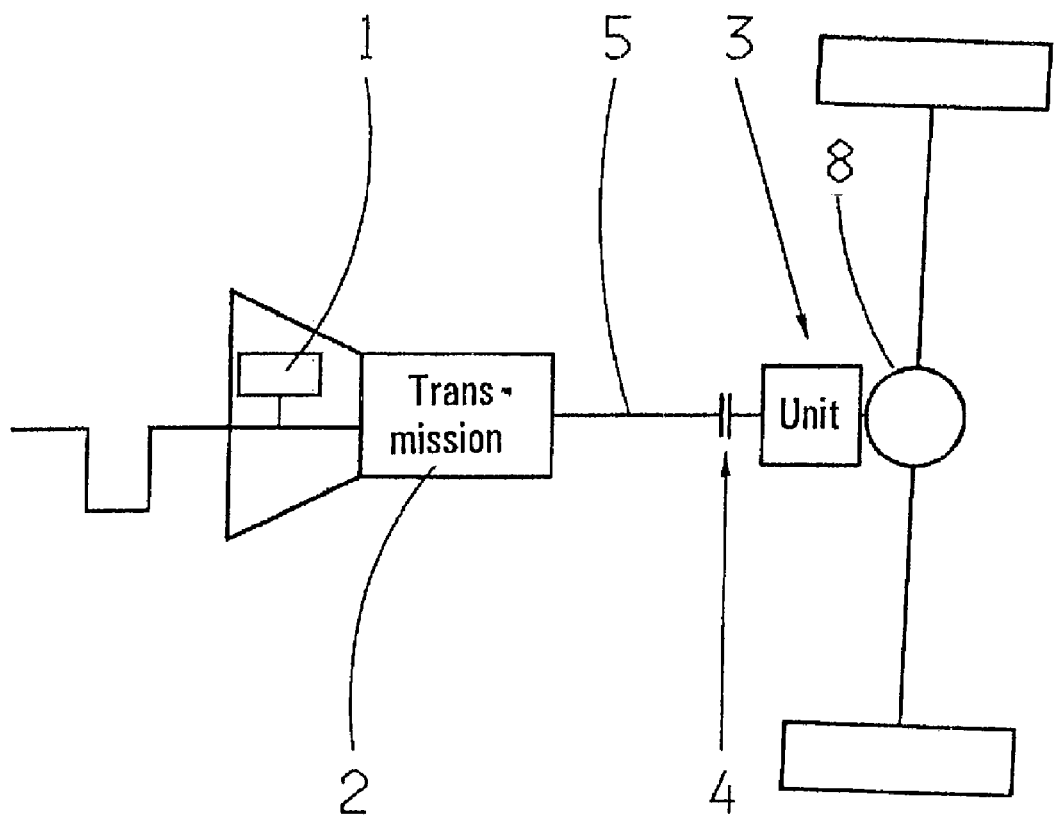
FIG. 5 is a schematic representation of an alternative arrangement of the unit comprising an electric machine and a planetary transmission designed as a planetary reducing gear system in the drivetrain of a motor vehicle.

FIG. 4 shows another example embodiment in which the rotor 11 of the electric machine is connected to the sun gear 9 and the ring gear 12 to the drive output to the Cardan shaft 7, the carrier 13 of the planetary transmission then being fixed on (coupled to) a housing. The unit 3 can again be attached directly on the differential 8.

Of course, any design form and, in particular, any spatial arrangement of the components of the drivetrain in themselves and in relation to one another, and insofar as it is technically appropriate, falls under the protective scope of the present claims without influencing the function of the drivetrain as indicated in the claims, even if such designs are not represented explicitly in the Figures or in the description.

REFERENCE NUMERALS 1 crankshaft starter generator
2 transmission
3 unit comprising an electric machine and a planetary transmission
4 flange
5 transmission output shaft
6 flange
7 Cardan shaft
8 differential
9 sun gear
10 reducing gear system, planetary transmission
11 rotor
12 ring gear
13 carrier
14 stator
15 shaft sealing ring
16 bearing

The invention claimed is:

1. A drivetrain of a hybrid motor vehicle, the drivetrain comprising:
    an electric machine (3) being arranged between a transmission (2) of the hybrid motor vehicle and a differential (8) of a driven axle for driving the driven axle via one of a Cardan shaft (7) and an other shaft capable of torque transfer,
    a reducing gear system (10) being arranged downstream, in a power flow direction, of the electric machine (3) for producing and transferring necessary speed and torque to one of the Cardan shaft (7) and the other shaft; and
    a drivetrain input shaft for the electric machine (3), which is coupled to the transmission (2), being rotationally fixedly connected to both a rotor (11) of the electric machine (3) and one rotatable element of the gear reducing system (10).

2. The drivetrain of the hybrid motor vehicle according to claim 1, wherein the reducing gear system (10) and the electric machine are combined as a single unit within a housing.

3. The drivetrain of the hybrid motor vehicle according to claim 2, wherein the single unit (3), comprising the reducing gear system (10) and the electric machine, is attached directly to the differential (8).

4. The drivetrain of the hybrid motor vehicle according to claim 1, wherein the reducing gear system (10) is a spur drive.

5. The drivetrain of the hybrid motor vehicle according to claim 1, wherein the reducing gear system (10) is a planetary transmission arranged downstream of the electric machine and co-axially with respect to one of the Cardan shaft (7) and the other shaft capable of torque transfer.

6. The drivetrain of the hybrid motor vehicle according to claim 5, wherein a sun gear (9) of the planetary transmission (10) is connected, in a rotationally fixed manner, to the rotor (11) of the electric machine, a ring annular gear (12) of the planetary transmission (10) is coupled to a housing, and drive output passes via a carrier (13) which is connected, in a rotationally fixed manner, with the drive output to one of the Cardan shaft (7) and the other shaft capable of torque transfer.

7. The drivetrain of the hybrid motor vehicle according to claim 5, wherein a ring gear (12) of the planetary transmission (10) is connected in a rotationally fixed manner to a rotor (11) of the electric machine, a sun gear (9) of the planetary transmission (10) is coupled to a housing, and a carrier (13) of the planetary transmission (10) passes drive output to one of the Cardan shaft (7) and the other shaft capable of torque transfer.

8. The drivetrain of the hybrid motor vehicle according to claim 5, wherein a rotor (11) of the electric machine is connected to a sun gear (9) and a ring gear (12) passes drive output to the one of the Cardan shaft (7) and the other shaft capable of torque transfer, while a carrier (13) of the planetary transmission (10) is attached to a housing.

9. The drivetrain of the hybrid motor vehicle according to claim 1, wherein a separating clutch is located between the rotor (11) of the electric machine and the one of the Cardan shaft (7) and the other shaft capable of torque transfer to interrupt a force flow.

10. The drivetrain of the hybrid motor vehicle according to claim 9, wherein the separating clutch is one of actuated hydraulically, mechanically and electrically.

11. The drivetrain of the hybrid motor vehicle according to claim 1, wherein, during an electrical driving operation, a clutch interrupts a connection between the electric machine and the transmission (2).

12. A drivetrain of a hybrid motor vehicle, the drivetrain comprising:
- a main transmission (2) having a transmission output shaft (5);
- a unit (3) having a housing, which encloses an electric machine and a planetary transmission (10), the electric machine having a rotor (11) and a stator (14), which is coupled to the housing, and the planetary transmission (10) having a sun gear (9), a carrier (13) and a ring gear (12);
- a drive output shaft (7) being co-axial with the planetary transmission (10) and the electric machine,
- a first end of the drive output shaft (7) engaging with the planetary transmission (10) and a second end of the drive output shaft (7) engaging a differential (8),
- a first flange (4) being located between the transmission (2) and the unit for connecting the supply of drive therebetween, and a second flange (6) being located between the unit and the differential (8) for connecting the supply of drive therebetween;
- such that the transmission output shaft (5) transfers torque, via the unit (3), to the drive output shaft (7) and the differential (8);
- the planetary transmission (10) being a reduction transmission and the ring gear (12) being fixed to one of the housing, the drive output shaft (7) and the rotor (11), the sun gear (9) being fixed to a remaining one of the housing and the rotor (11) and the carrier (13) being fixed to a final one of the housing and the drive output shaft (7); and
- a drivetrain input shaft for the unit (3), which is coupled to the transmission (2), being rotationally fixedly connected to both the rotor (11) and one of the sun gear (9), the carrier (13) and the ring gear (12) of the planetary transmission (10).

13. The drivetrain of the hybrid motor vehicle according to claim 12, wherein the ring gear (12) is fixed to the housing, the sun gear (9) is fixed to the rotor (11) and the carrier (13) is fixed to the drive output shaft (7).

14. The drivetrain of the hybrid motor vehicle according to claim 12, wherein the ring gear (12) is fixed to the drive output shaft (7), the sun gear (9) is fixed to the rotor (11) and the carrier (13) is fixed to the housing.

15. The drivetrain of the hybrid motor vehicle according to claim 12, wherein the ring gear (12) is fixed to the rotor (11), the sun gear (9) is fixed to the housing and the carrier (13) is fixed to the drive output shaft (7):.

16. A drivetrain of a hybrid motor vehicle, the drivetrain comprising:
- a main transmission (2) having a transmission output shaft (5);
- a unit (3) having a housing which encloses an electric machine and a planetary transmission (10), the electric machine comprising a rotatable rotor (11) and a stator (14) being fixedly connected to the housing, the planetary transmission (10) comprising a sun gear (9), a carrier (13) and a ring gear (12), and the unit being arranged between the main transmission (2) and a differential (8) of the hybrid motor vehicle;
- the transmission output shaft (5) being connected to supply drive input to a drivetrain input shaft of the unit and, the drivetrain input shaft being rotationally fixedly connected to and directly driving both the rotor (11) and one of the sun gear (9),
- the carrier (13) and the ring gear (12) of the planetary transmission (10);
- a first fixed connection mechanism (4) interconnecting the transmission output shaft (5) with the unit (3) for connecting the supply of drive therebetween;
- a second fixed connection mechanism (6) interconnecting an output shaft (7) with the unit (3) for connecting the supply of drive therebetween; and
- the output shaft (7) connecting the planetary transmission (10) with a differential (8) to supply drive input thereto.

17. The drivetrain of the hybrid motor vehicle according to claim 16, wherein the ring gear (12) is secured to the housing, the sun gear (9) and the rotor (11) are both directly driven by the transmission output shaft (5) via the drivetrain input shaft, and the carrier (13) is secured to the drive output shaft (7).

* * * * *